United States Patent
Franke et al.

(10) Patent No.: US 11,050,635 B2
(45) Date of Patent: Jun. 29, 2021

(54) MANAGING BARE METAL NETWORKING IN A CLOUD COMPUTING ENVIRONMENT

(71) Applicant: INTERNATIONAL BUSINESS MACHINES CORPORATION, Armonk, NY (US)

(72) Inventors: Hubertus Franke, Cortlandt Manor, NY (US); Christoph Raisch, Gerlingen (DE); Marcio Augusto Silva, Mahopac, NY (US); Gheorghe Almasi, Ardsley, NY (US); Marc Cochran, Shrewsbury, MA (US); Alan Ross, Windham, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 16/267,829

(22) Filed: Feb. 5, 2019

(65) Prior Publication Data
US 2020/0252304 A1 Aug. 6, 2020

(51) Int. Cl.
*H04L 12/24* (2006.01)

(52) U.S. Cl.
CPC .......... *H04L 41/28* (2013.01); *H04L 41/0806* (2013.01)

(58) Field of Classification Search
CPC ....................................................... H04L 41/28
USPC ........................................................ 709/222
See application file for complete search history.

(56) References Cited

U.S. PATENT DOCUMENTS

| 8,214,653 | B1 * | 7/2012 | Marr ..................... G06F 21/572 |
| | | | 713/189 |
| 8,478,907 | B1 * | 7/2013 | Aloni .................... G06F 13/128 |
| | | | 709/250 |
| 8,959,611 | B1 | 2/2015 | Vincent et al. |
| 8,971,538 | B1 * | 3/2015 | Marr ........................ G06F 8/65 |
| | | | 380/285 |
| 9,176,767 | B2 | 11/2015 | Cantu |
| 9,712,538 | B1 * | 7/2017 | Vincent ................... H04L 67/10 |
| 2009/0307340 | A1 * | 12/2009 | Haneefa .............. G06F 11/0709 |
| | | | 709/222 |
| 2010/0199351 | A1 * | 8/2010 | Protas .................. G06F 9/45558 |
| | | | 726/25 |
| 2011/0202983 | A1 * | 8/2011 | Pope ..................... H04L 63/061 |
| | | | 726/7 |
| 2016/0248620 | A1 * | 8/2016 | Itkin ....................... H04L 41/04 |
| 2017/0094377 | A1 * | 3/2017 | Herdrich ................ H04L 43/10 |
| 2017/0351558 | A1 | 12/2017 | Choudhari |
| 2018/0124163 | A1 * | 5/2018 | Abali .................... H04L 67/303 |

(Continued)

OTHER PUBLICATIONS

"Method and System for Utilizing Network Interface Card Virtual Ports for Data Center Secure Cloud/Shared Host Migration" at:https://ip.com/IPCOM/000236628 Authors et. al.: Disclosed Anonymously IP.com No. IPCOM000236628D IP.com Electronic Publication Date: May 6, 2014 (4 Pages).

(Continued)

*Primary Examiner* — Moustafa M Meky
*Assistant Examiner* — Kidest Mendaye
(74) *Attorney, Agent, or Firm* — Griffiths & Seaton PLLC

(57) ABSTRACT

Embodiments for managing bare metal networking in a cloud computing environment. A network communication module that receives a configuration instruction over a direct network link from an external remote management device on a network endpoint may be initialized.

20 Claims, 8 Drawing Sheets

(56) References Cited

U.S. PATENT DOCUMENTS

2018/0270109 A1* 9/2018 Hollis ................. H04L 41/0803
2019/0042741 A1* 2/2019 Abodunrin ............ G06F 21/554

OTHER PUBLICATIONS

"Method for Sizing Datacenter Secure Cloud or Shared-Host Migration Utilizing NIC Virtual Ports" Authors et. al.: Disclosed Anonymously IP.com Electronic Publication Date: Sep. 18, 2014 ( 2 Pages).
"Dynamic Deployment of Large Scale Virtual Machines in Cloud Environment" Authors et. al.: Disclosed Anonymously IP.com Electronic Publication Date: Mar. 28, 2016 (5 Pages).
"Methodology of Exploring ESLIRTL Many-Core Platforms for Developing Embedded Parallel Applications" Lai et al. Department of Computer Science, National T sing Hua University, Hsinchu, Taiwan Department of Electrical Engineering, National T sing Hua University, Hsinchu, Taiwan Information and Communications Research Laboratories, Industrial Technology Research Institute, Hsinchu, Taiwan (6 Pages).
"Consider Bare-Metal as a Viable Cloud Option" by Richard Fichera, Apr. 27, 2015 (11 Pages).

* cited by examiner

MANAGING BARE METAL NETWORKING IN A CLOUD COMPUTING ENVIRONMENT

BACKGROUND OF THE INVENTION

Field of the Invention

The present invention relates in general to computing systems, and more particularly to, various embodiments for managing bare metal networking in a cloud computing environment.

Description of the Related Art

A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for managing bare metal networking in a cloud computing environment are provided. In one embodiment, by way of example only, a method for providing and managing bare metal networking for bare metal machines in a cloud environment, again by a processor, is provided. A network communication module that receives a configuration instruction over a direct network link from an external remote management device on a network endpoint may be initialized.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
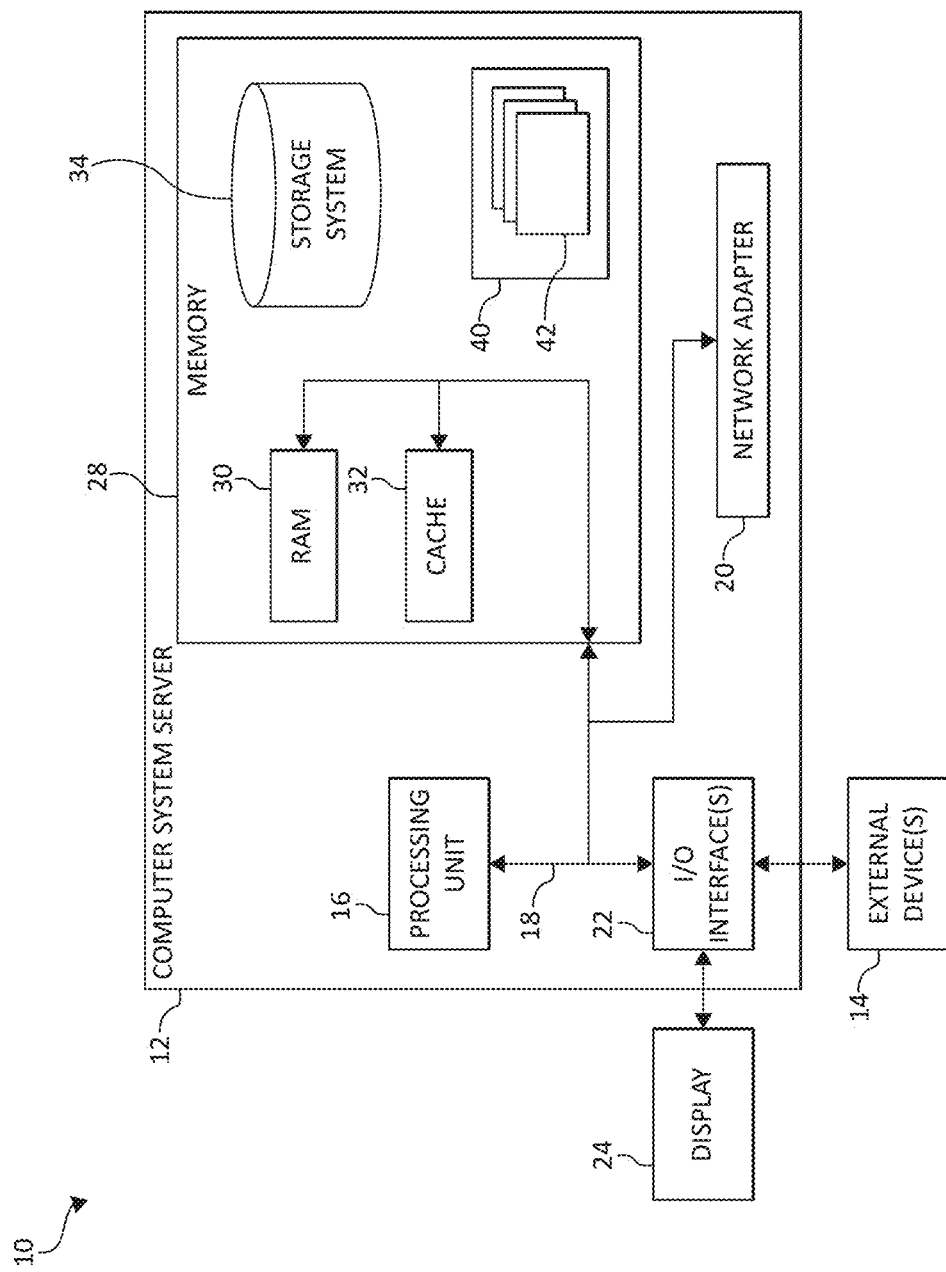
FIG. 1 is a block diagram depicting an exemplary computing node according to an embodiment of the present invention.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services.

Cloud computing environments are typically a cluster of compute nodes integrated via networking fronted by a service layer. The compute nodes are connected via network interface cards ("NICs") to a set of network switches. In addition, storage nodes are typically attached to network gear or, alternatively, the compute nodes can also serve as storage nodes.

In cloud computing environments, the infrastructure is commonly consumed via a portal as a virtual infrastructure (e.g., the IaaS), virtual compute, virtual network and virtual storage and isolates the end user from the specifics of the underlying hardware and services. In turn, the burden of isolation in the face of multi-tenancy is placed on the cloud provider. To achieve this isolation, the cloud provider utilizes hypervisors that run on each compute.

Hypervisors or "virtual machine monitor" ("VMM") are computer software, firmware, and/or hardware that deploy virtual machines to provide the virtual compute. A computer on which a hypervisor runs one or more virtual machines is called a host machine. At the networking level, the hypervisor can translate virtual networking information into encapsulation rules and actions that are either executed as a software module as part of the hypervisor networking stack or the hypervisor configures rules on the NIC, which increasingly have capabilities to run soft-switches and tunneling engines (e.g., encapsulation) to transport virtual traffic over physical connections.

In this context, networking provides overlay and underlay networking. Underlay is referred to how packets are routed between two physical machines. This could be Layer 2 (e.g., data link) or Layer 3 (e.g., network layer) of the Open Systems Interconnection ("OSI") 7-layer model. Overlay networking is at the conceptual level of a virtual network that is encapsulated on top of the underlay networks. The user has access to and control over the overlay network created by the user. However, it does not (and must not) have access to the underlay network for reasons of isolation and security.

Increasingly, bare metal machines are available as part of IaaS offerings. The term "bare metal" refers to a hard disk, the usual medium on which a computer's operating system ("OS") is installed. Bare metal machines may be a computer system or network in which a virtual machine is installed directly on hardware rather than within the host OS. In bare metal machine infrastructure, the user can request an entire machine, running only its own operating system and no hypervisor is present, which is done for reasons of performance (e.g., avoid noisy neighbors), access to accelerators (for which often virtualization has not been implemented yet (e.g., graphics processing unit "GPU", machine learning accelerators, etc.), or other reasons.

However, providing the user the entire machine, running only its own operating system and no hypervisor presents significant security challenges as a user now has full access to the NIC. As a consequence, the user could modify the underlay network (by coincident or by intention) and potentially bring down the entire cloud network, for instance through packet flooding or through misconfiguration of the underlay network.

There have been approaches where general-purpose central processing units ("CPUs") have been added to NICs, often referred to as smart-NICs. In such scenarios, the CPU on the smart-NIC may run its own operating systems and all configurations management is delegated from the host system to the NIC OS via a network connection and all direct configuration management is disabled to the host. The drawback of this approach is that the smart-NIC is significantly more expensive and at scale can significantly drive up costs for a cloud provider. In addition, the power consumption is significantly higher. Other approaches drive encapsulation and tunneling features and functions towards the top of rack ("TOR") switch, however given the increasing number of ports that TOR supports, this approach requires significant silicon floorspace at the TOR.

Thus, a need exists for providing bare metal access in cloud environment without the need of expensive and higher power consuming NICs and without the need for additional function in the TORs. Accordingly, various embodiments are provided for managing bare metal networking in a cloud computing environment are provided. In one embodiment, a network communication module that receives a configuration instruction over a direct network link from an external remote management device on a network endpoint may be initialized.

In an additional aspect, the present invention provides for managing bare metal networking for bare metal machines in a cloud environment. Rather than requiring expensive smart NICs or pushing functionality into the TOR switch, the present invention a) provides a secure network communication module to communicate with a remote proxy that serves as a software defined networking ("SDN") agent, b) provides a two-step boot process that in a first boot operation provides a secure, certified kernel by the cloud infrastructure management operation to setup one or more rules and communication credentials for the remote proxy, disables the ability to program the NIC and reboots the machine, and c), in the second boot operation, the customer bare metal OS image is booted which at this point does not have access to the configuration of the network card, but can only send/receive packets.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
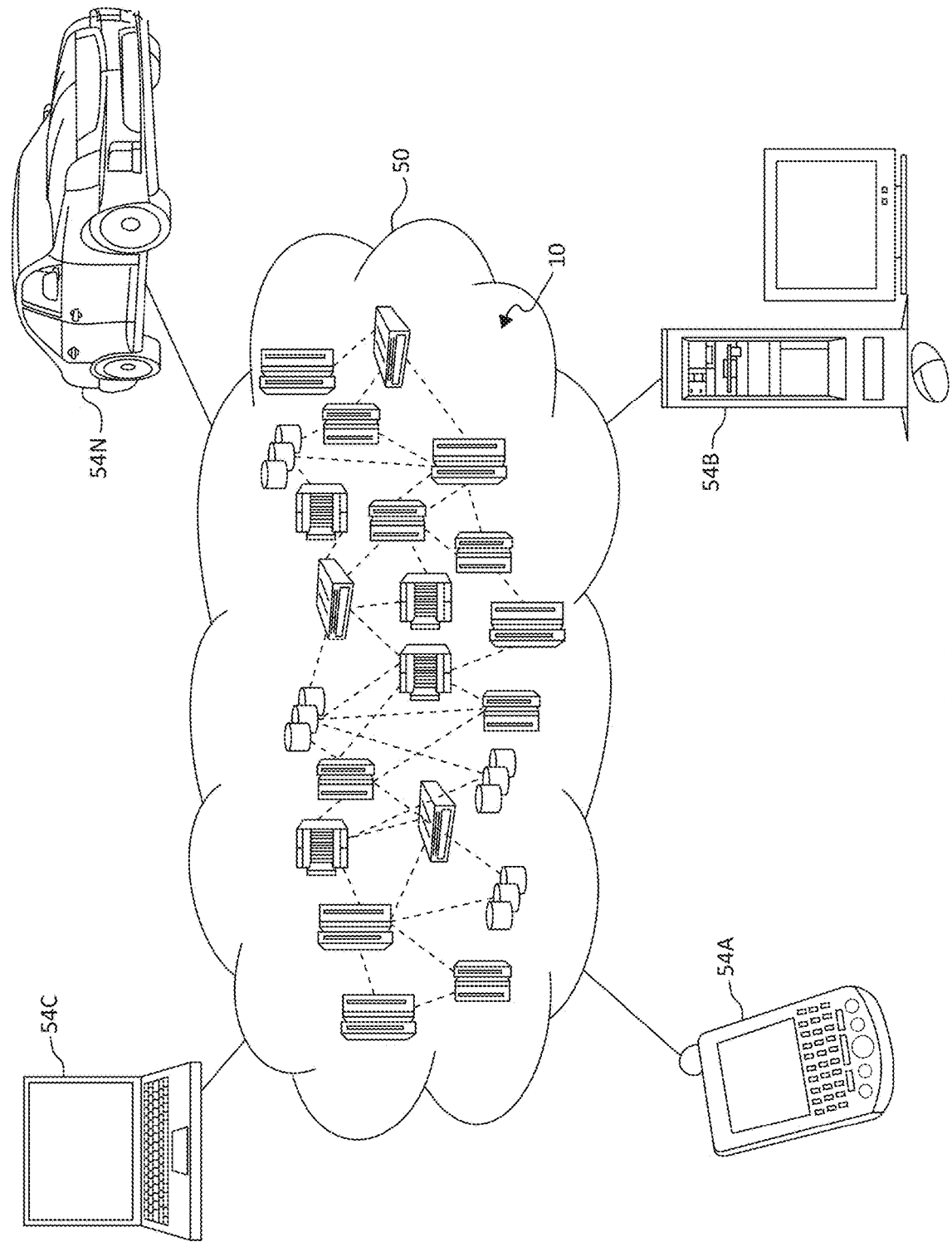
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, an intelligent ("smart") mattress 54D, and/or automobile computer system 54N may communicate. As used herein, a mattress such as, for example mattress 5D may be a pad, mat, cushion, foam, or object designed for supporting or reclining all or portions of a body such as, for example, a bed (or part of a bed), couch, sofa, recliner, seat, chair, or seat.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
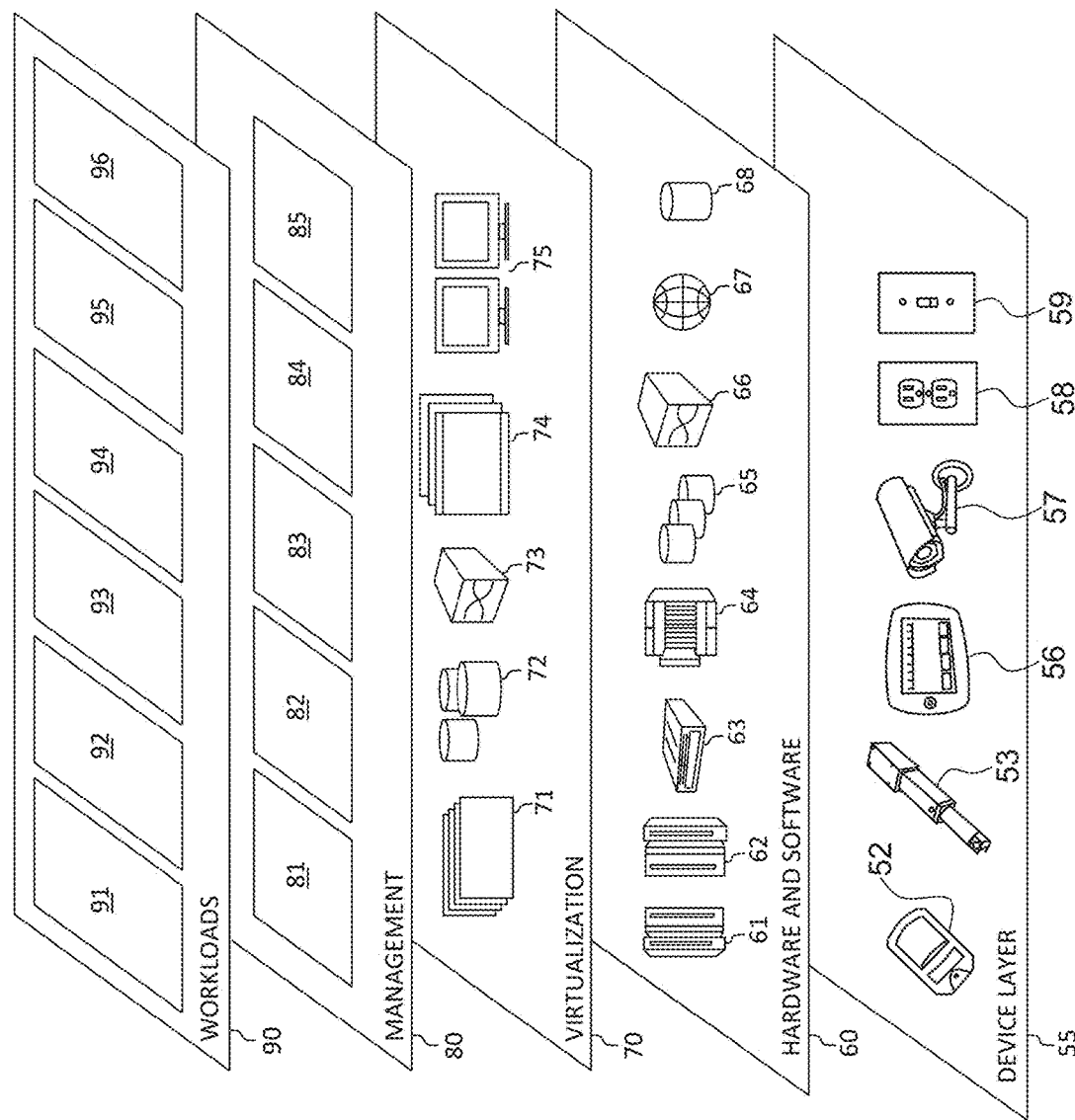
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various bare metal networking and managing workloads and functions 96. In addition, configuring settings for various bare metal networking and managing workloads and functions 96 may include such operations as data analysis (including data collection and processing from various environmental sensors), networking, sending/receiving data, providing virtualization/virtual compute, encryptions, cloud computing communications, and/or management functions. One of ordinary skill in the art will appreciate that the configuring settings for various computer-controlled devices using workloads and functions 96 for bare metal networking and managing may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the present invention provide a novel approach for providing and managing bare metal networking for bare metal machines in a cloud environment, again by a processor, is provided. A network communication module that receives a configuration instruction over a direct network link from an external remote management device on a network endpoint may be initialized.

In one aspect, the present invention provides for managing bare metal networking for bare metal machines in a cloud environment using a device having a network adapter with embedded controller and trust anchor with two operation modes ((i) open and (ii) remote managed mode). In open mode, the host has full access to the configuration of the network adapter, while in remote managed mode the adapter configuration can only be managed by a remote agent thus leaving only packet send/receive to the host. The device may be in communication with a remote configuration endpoint communicating with the network adapter through a secure network path/data link. The device may also be in communication with a server running a trusted forwarding (fw) update environment switching adapter from open to remote managed mode. An uplink network component (e.g., a switch) may be associated with the device verifying if the remote managed mode is enabled or disabled.

Figure 4:
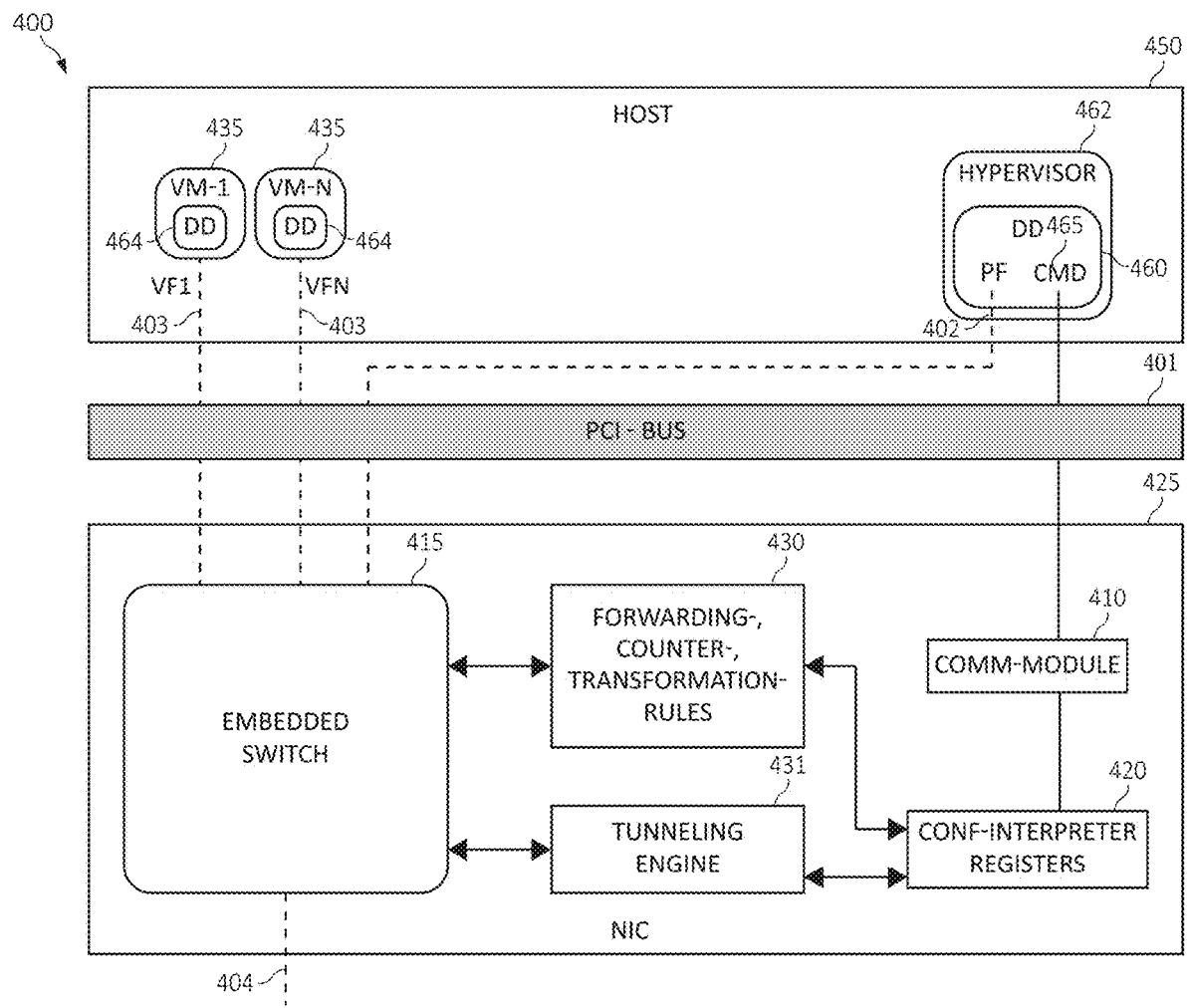
FIG. 4 illustrates a cloud computing network in which various aspects of the present invention may be realized.

Turning now to FIG. 4, a cloud computing environment 400 is depicted using a cloud networking stack comprised of a NIC 425 (e.g., a single root input/output virtualization "SR-IOV" capable NIC) and a host system (450). In network virtualization, the SR-IOV is a specification that provides for the isolation of a peripheral component interconnect ("PCI") Express Bus 401 resources for manageability and performance reasons. A single physical PCI Express network device can thus be shared on a host. In one aspect, "SR-IOV" implies that the NIC 425 not only surfaces the typical physical function ("PF") 402 upon which the host 450 OS will communicate via device drivers 460 to send and receive packets via the NIC 425 to the network 404, but also virtual functions 403 (e.g., "VF"/VFi such as, for example, VF1-VFn) that can be used for instance for virtual machines VM 435A-B (e.g., VM-1, VM-n) to communicate directly via the NIC 425 to the network 404 via device drivers ("DD") 464. The difference is that PFs 402 have full control over the NIC's 425 configuration management, whereas VFs 403 are limited to sending and receiving data packets. The VFs 403 may be created and setup by the host system 450 by communicating over a command interface ("CMD") 465 that is part of the device drivers 460 of hypervisor 462 to the NIC 425.

In order to properly function, the NIC 425 provides an embedded switch 415 that either receives packets from the network and routes them based on a forwarding database ("FDB") to one of the VFs 403 or vice versa tags packets from a VF 403 with an appropriate a virtual local area network ("VLAN") tag. Hence, automatic tagging is a key function that may be supported by the NIC 425. Another type of networking support is encapsulation, where as a packet received from a guest (e.g., VF 403) corresponding to a virtual network endpoint is encapsulated as data into a packet that then will be routed over the underlay network to the target machine upon which the packet needs to be decapsulated and injected into the correct VF. For both, rules 430 must be configured that describe the conditions and actions of a packet processing pipeline including the encapsulation/tunneling engine 431.

Figure 5:
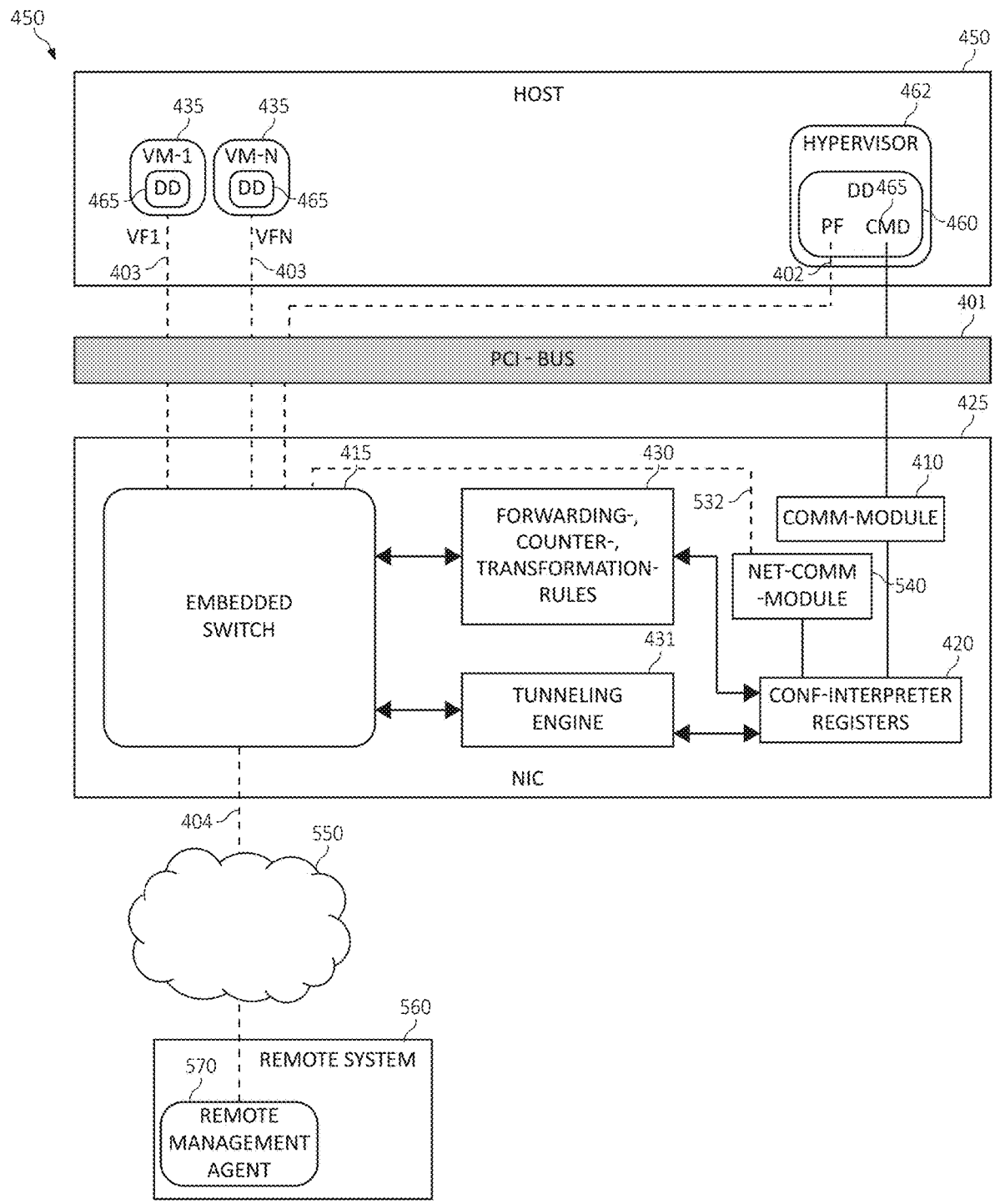
FIG. 5 illustrates a cloud computing network with a network communication module in a network interface card ("NIC") in which various aspects of the present invention may be realized.

Turning now to FIG. 5, depicts managing bare metal networking for bare metal machines 500 in a cloud environment using a network communication module in the NIC 525. It should be noted that the descriptions and embodiments of FIGS. 1-4 can be used in FIG. 5. Repetitive description of like elements employed in other embodiments described herein (e.g., FIG. 4) is omitted for sake of brevity.

The operating software ("OS") of the host 450, utilizing commands path of the device drivers 460, may create requests to the NIC 425 to setup one or more rules and configurations (e.g., using configuration information), which may be performed through exposed registers and/or a comm-module 410 (e.g., a command queue or communication module). The command may be interpreted via an interpreter 420 (e.g., configuration-interpreter registers) and then the interpreter 420 may insert/delete the required rules in a rule base 430 and or tunneling engine 431. It should be noted that an OS in a bare metal system may have access to the device driver ("DD") 460 (e.g., similar to a hypervisor 462) and may be able to setup any rules and thus essentially the OS can take control about parts of the underlay network.

In one aspect, the present invention provides a network communication module 540 in the NIC 425, which may be for providing capabilities of bare metal systems/OS, yet at the same time, the network communication module 540 prohibits the bare metal systems/OS from misconfiguring the system.

Thus, the NIC 425 may serve/provide one or more similar functions as a host communication module 410 but receives commands from a remote management agent 570 similar to the one typically running on the host but running on a different machine such as, for example, remote system 560. The remote management agent 570 sends network configuration commands over the network 550, which are routed via embedded switch 415 to a net-comm-module 540 which acts as an authenticated end point that can issue the configuration commands to the conf-interpreter 420. Rather, instead of configuring the NIC 425 via the comm-module 410 (e.g., PCI command queue 410), the NIC 425 may be configured through the same software running as a remote agent 570 on remote system 560, but directly over a network link (e.g., network 550) that is intercepted in the eSwitch 415 and routed via internal connector 532 to the network communication module 540 where it is issued to the command interpreter such as, for example, interpreter 420.

At a high-level perspective, when the host 450 and hence the NIC 425 are powered up, the host 450 performs a netboot. The netboot server initially supplies an OS to boot that is provided by the cloud computing provider (e.g., the host 450) and hence the OS is trusted. The OS may be the OS that contains the hypervisor deployed in regular operations. As a second step, the trusted booted OS will configure the NIC 425 according to the following operations.

In step 1), the NIC 425 is configured by receiving network information including which virtual network a bare metal system belongs to, but the bare metal system is unable to get access to the underlay.

In step 2), the NIC 425 is configured by receiving security credentials of an agent which is permitted as acting as a host agent (proxy agent) such as, for example, the remote management agent 570.

In step 3), the NIC 425 is configured by creating a set of rules and actions for all traffic to the PF to be tagged or encapsulated onto a virtual network, namely that the bare metal machine will ultimately be assigned to.

In step 4), the NIC 425 is configured by injecting one or more rules and actions into the rule base and tunneling engine.

In step 5), the NIC 425 is configured by setting up forwarding rules and encryption secrets between a proxy agent such as, for example, the remote management agent 570 and the communication module 410 (e.g., comm-module), so that the proxy agent and the communication module 410 can securely communicate.

In step 6), the NIC 425 is configured by locking down an adapter, which means setting the communication module 410 ("comm-module 410") to restrict certain functions that can modify the rules and the tunneling engine from the PF, essentially deprecating it to the capabilities of a VF.

In step 7), the NIC 425 is configured by initiating a second boot operation without a power reset in order retain the settings of the NIC 425, which, should for any reason the NIC 425 be power cycled off, then the process is required to start again with step 1 or operation "1"). If, for example, a device resets by an error condition, the device will always trigger a reboot through existing PCIe 401 signaling to step 1.

Upon 2nd boot a user provided, potentially untrusted, the OS is supplied via netboot and booted. Upon boot, the device driver 460 only has access through standard network functions of the NIC 425, however the NIC 425 via the communication module 410 suppresses any configuration changes which alter the identity on the network (MAC) or add back characteristics modified in step 6.

Figure 6:
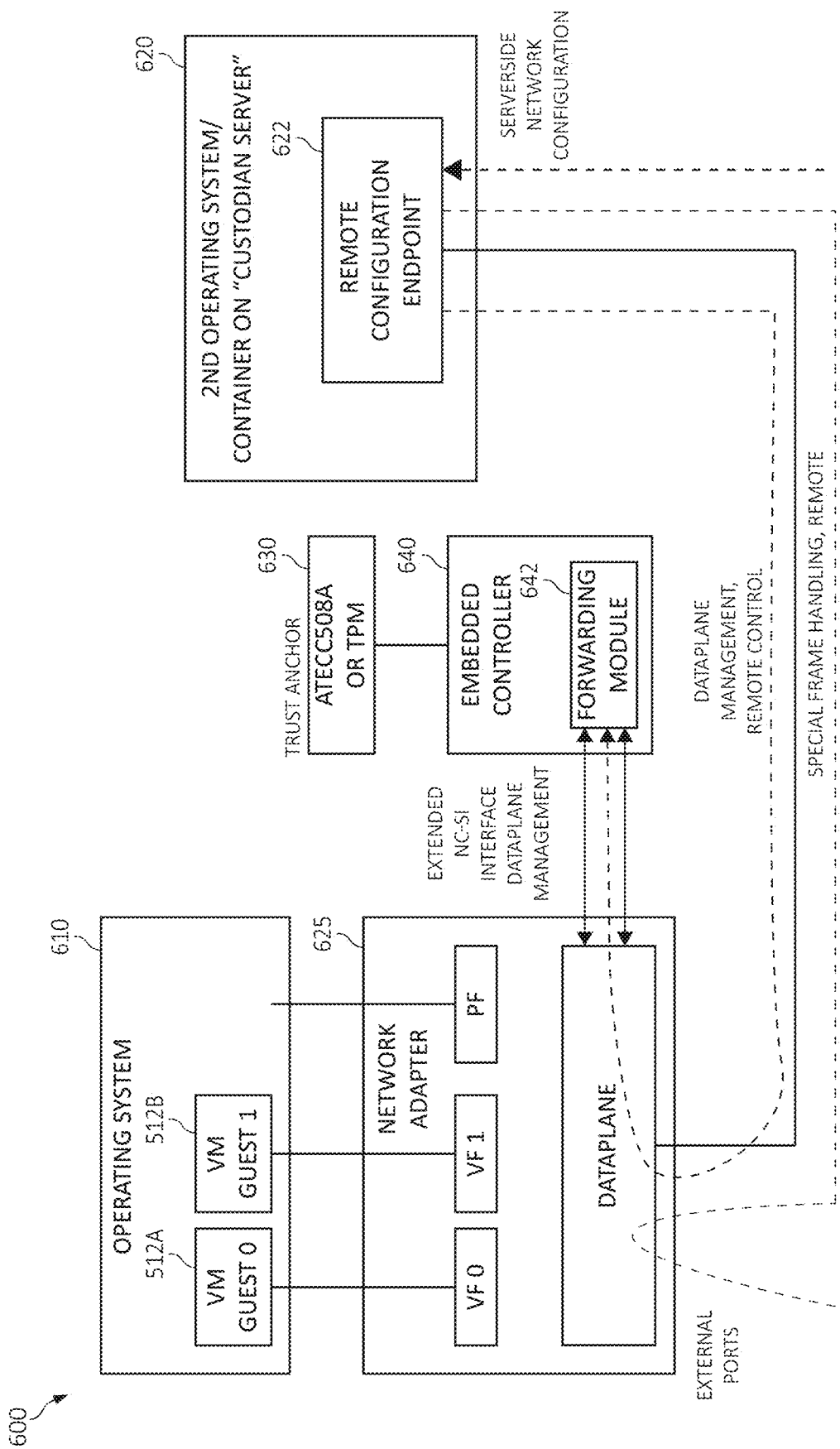
FIG. 6 illustrates a cloud computing network with a network adapter with an embedded controller and a trust anchor in a cloud computing network in which various aspects of the present invention may be realized

An agent such as, for example, the remote management agent 570 that was previously run on either the host 450 or the NIC 425, is now placed on a different proxy agent/ remote system 560 or host 620 of FIG. 6. The proxy agent such as, for example, the remote management agent 570 may be responsible for configuring the NIC 425 such as, for example, setting up overlay networking. Because the proxy agent is located on a secure host such as, for example, the remote system 560 and/or host 620 of FIG. 6 and the because the PF is disabled on the bare metal machine (500) after step 6, the end user is unable to control the PF and hence has no direct control over forwarding rules and tunneling engine rules.

The internet protocol ("IP") address of host IP address or layer 2 ("L2") network connection parameters (e.g., media access control ("MAC") address, local area network ("LAN"), virtual extensible LAN ("VXLAN"), etc.) of the physical host is setup. However, this IP address is not the IP address of the bare metal machine as perceived by the user (who provided an address in its virtual network space). This is similar to baseboard management controllers ("BMC") connected by a network controller sideband interface ("NC-SI") where the NIC 425 (e.g., network adapter) presents multiple MAC addresses on a single ethernet connection, one for the NC-SI connected controller and the rest of the MAC range for the host 450. It should be noted that NC-SI ("Network Controller Sideband Interface") is an electrical interface and protocol defined by the Distributed Management Task Force (DMTF), which enables the connection of a BMC to a set of Network Interface Controller(s) in server computer systems for the purpose of de-enabling out-of-band remote manageability.

While NC-SI utilizes special frames dictated by NC-SI, the present invention relies on standard Ethernet framing. Any packets received by the bare metal machine on the host 450, the IP/MAC address will be automatically routed to the network communication module 540 via the rules setup under step 3 and/or 4. In order to avoid proxy agent masquerading, data packets sent between the proxy agent such as, for example, the remote management agent 570 and the network communication modules 540 must be encrypted using the credentials provided under step 2 and setup in step 5. To authorize, authenticate, and encrypt traffic an established protocol (e.g., internet protocol security ("IPsec"), institute of electrical and electronics engineers ("IEEE") 802.1AE or QUIC) is used.

Turning now to FIG. 6, a cloud computing network 600 such as, for example, cloud computing environment 50 of FIG. 2, comprising network adapter 625 with an embedded controller 640 and a trust anchor 630, is schematically disclosed. It should be noted that the descriptions and embodiments of FIGS. 1-4 and 5 can be used in FIG. 6. Repetitive description of like elements employed in other embodiments described herein (e.g., FIGS. 1-5) is omitted for sake of brevity.

In one aspect, the network adapter 625 may be in communication with an operating system ("OS") 610 and a second OS 620 (e.g., a container on a custodian/host server). The OS 610 may include one or more VM guests 612A, 612B such as, for example, VM guest 0 and VM guest 1. The second OS 620 may include a remote configuration endpoint (e.g., network endpoint 622) that controls the network adapter 625 (e.g., a network card).

The network adapter 625 may include a dataplane 627, one or more PFs and VFs (e.g., VF0 and VF1). The network adapter 625 may include the embedded controller 640, which may include a forwarding module 642, and the trust anchor 630. The network adapter 625 may operate in two operation modes (e.g., everything open and/or remote managed mode). The remote configuration endpoint 622 may communicate with the network adapter 625 through secure network path (e.g., datalink). A server running a trusted fw update environment switching adapter (e.g., embedded switch 515 of FIG. 5) from open to remote managed mode. An uplink network component (a switch) may verify if remote managed mode is enabled and/or disabled.

The network adapter 625 may also include the network communication module (e.g., network communication module 540 of FIG. 5) and the network adapter 625 may be initialized upon receiving a configuration instruction over a direct network link from an external remote management device (e.g., second OS 620) on a network endpoint 622.

The network adapter 625 may receive the configuration instruction along a serverside network configuration sent to the direct network link from an additional operating system 620 at the network endpoint 622.

The network adapter 625 may operate in remote managed mode from the external remote management device. One or more rules and configuration parameters using the configuration instruction maybe established for communicating with the network adapter 625 (e.g., the network communication module 540 of FIG. 5 of the network adapter 625).

The network adapter 625 may restrict one or more functions or operation from modifying the one or more rules and configuration parameters (e.g., using the network communication module 540 of FIG. 5). One or more data packets may be automatically routed to the network adapter 625 according to the one or more rules and configuration parameters. The network adapter 625 may encrypt one or more data packets sent between the network communication module and the external remote management device according to the configuration information.

Figure 7:
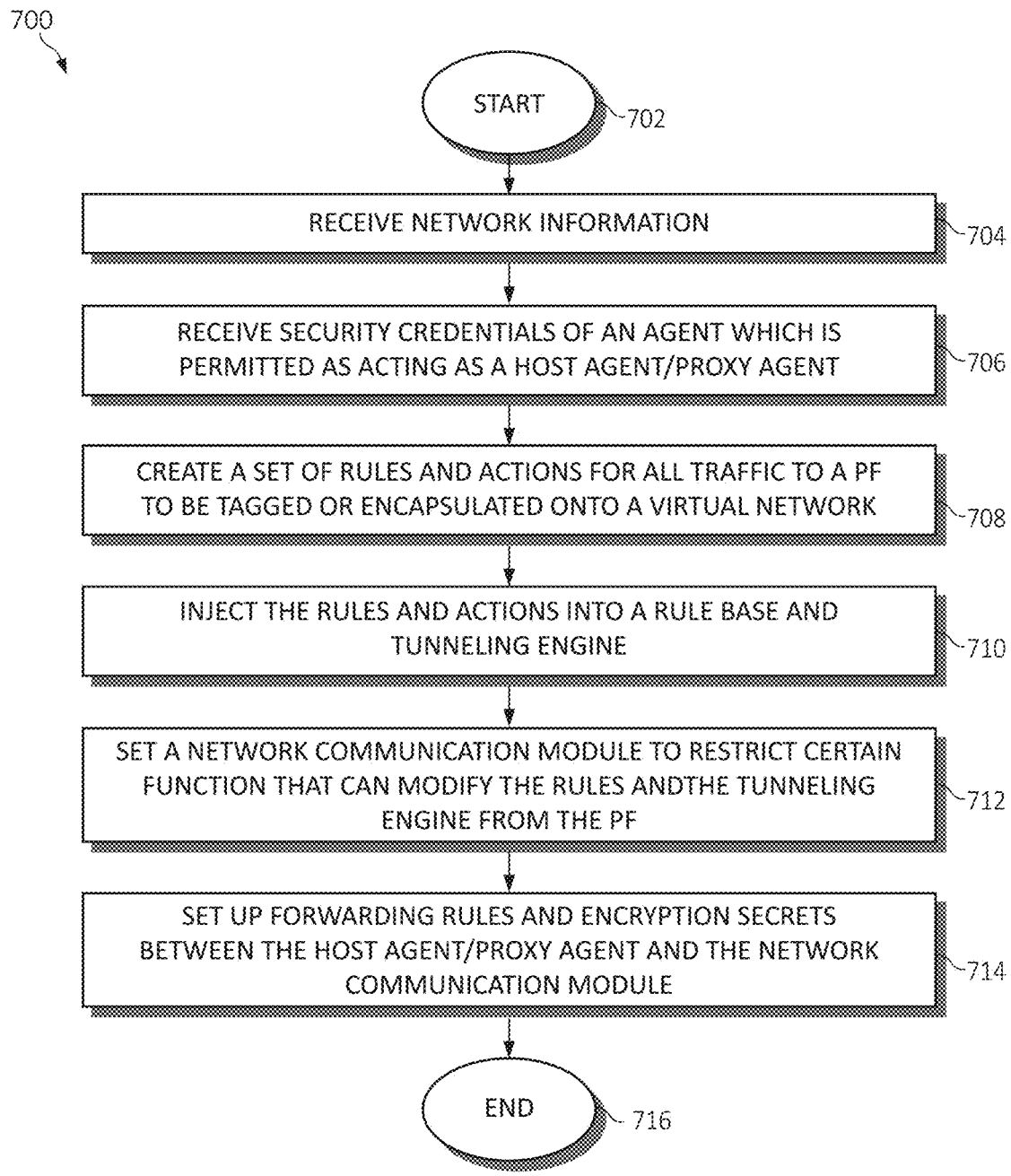
FIG. 7 is a flowchart diagram depicting an exemplary method for configuring a network communication module for managing bare metal networking in a cloud computing environment in accordance with aspects of the present invention.

Turning now to FIG. 7, a method 700 for configuring a network communication module for managing bare metal networking in a cloud computing environment is depicted. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

Network information may be received (e.g., network information indicating which virtual network a bare metal system belongs to), as in block 704. Security credentials of an agent may be received, which is permitted as acting as a host agent/proxy agent, as in block 706. A set of rules and actions may be created for all traffic to a physical function ("PF") to be tagged or encapsulated onto a virtual network, as in block 708. The rules and actions may be sent/injected into a rule base and tunneling engine, as in block 710. A network communication module may be set/configured to restrict one or more selected functions from modifying the rules and the tunneling engine from the PP (e.g., lock down an adapter), as in block 712. One or more forwarding rules and encryption secrets may be set up/established between the host agent/proxy agent and the network communication module (in the NIC), as in block 714. The functionality 700 may end, as in block 716.

It should be noted, following block 714, a second boot operation may be performed without a power reset in order retain the settings of the NIC (should for any reason the NIC be power cycled, then the process has to start again with block 704). If a device resets by an error condition, the device will always trigger a reboot through existing PCIe signaling to block 704. Upon the second boot operation, a user provided OS (which may be untrusted) may be supplied via netboot and booted. Upon performing the boot, the device driver only has access through standard network functions of the NIC, however the NIC suppresses configuration changes which alter the identity on the network (MAC) or add back characteristics modified in block 712.

Figure 8:
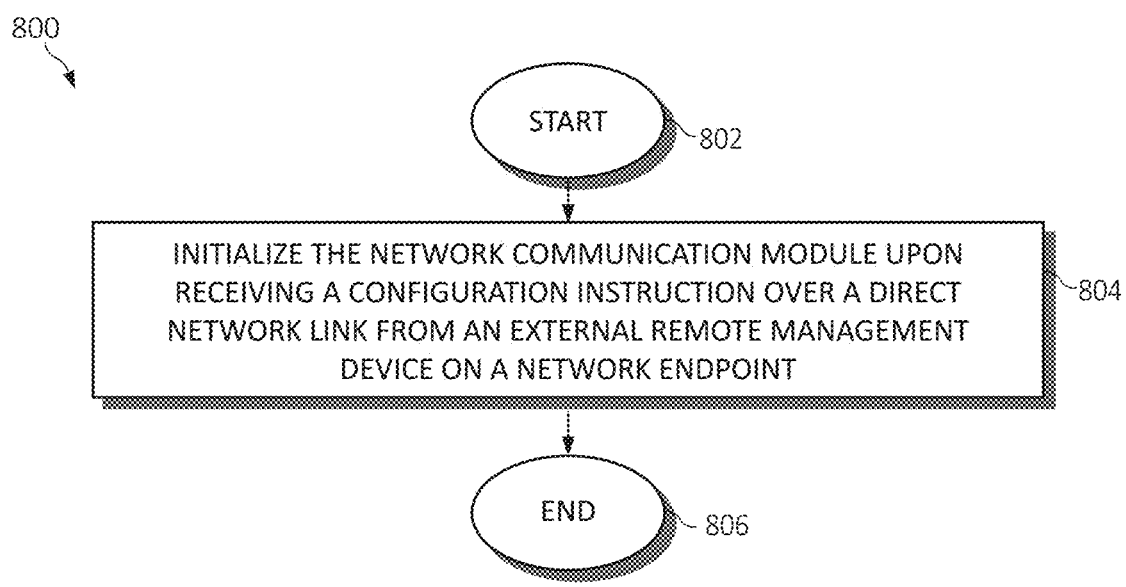
FIG. 8 is a flowchart diagram depicting an exemplary method for managing bare metal networking in a cloud computing environment, again in which various aspects of the present invention may be realized.

Turning now to FIG. 8, a method 800 for managing bare metal networking in a cloud computing environment is depicted. In one aspect, each of the devices, components, modules, operations, and/or functions described in FIGS. 1-7 also may apply or perform one or more operations or actions of FIG. 8. The functionality 800 may be implemented as a method executed as instructions on a machine, where the instructions are included on at least one computer readable medium or one non-transitory machine-readable storage medium. The functionality 800 may start in block 802.

A network communication module that receives a configuration instruction over a direct network link from an external remote management device on a network endpoint may be initialized, as in block 804. The functionality 800 may end, as in block 810.

In one aspect, in conjunction with and/or as part of at least one block of FIG. 8, the operations of method 800 may include each of the following. The operations of method 800 may receive the configuration instruction along a serverside network configuration sent to the direct network link from an additional operating system at the endpoint. The operations of method 800 may enable the network communication module to operate in remote managed mode from the external remote management device.

The operations of method 800 may establish one or more rules and configuration parameters using the configuration instruction for communicating with the network communication module, restrict one or more functions or operation from modifying the one or more rules and configuration parameters using the network communication module, and/or automatically route one or more data packets to the network communication module according to the one or more rules and configuration parameters. The operations of method 800 may encrypt one or more data packets sent between the network communication module and the external remote management device according to the configuration information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing bare metal networking in a cloud computing environment, comprising:
   performing a first boot of a host, wherein the first boot initializes a network communication module, associated with a network interface card of the host, that receives a configuration instruction over a direct network link from an external remote management device on a network endpoint; and
   responsive to receiving the configuration construction and configuring the network interface card, performing a second boot via a soft reset of the host, wherein subsequent to the second boot the network communication module suppresses any configuration changes associated with the network interface card, and wherein at any time subsequent to the second boot the network interface card is power cycled or reset by an error condition, the host re-initializes the network communication module and re-configures the network interface card by repeating the steps associated with performing the first boot and the second boot.

2. The method of claim 1, further including receiving the configuration instruction along a serverside network configuration to the direct network link from an additional operating system at the endpoint.

3. The method of claim 1, further including enabling the network communication module to operate in remote managed mode.

4. The method of claim 1, further including establishing one or more rules and configuration parameters using the configuration instruction for communicating with the network communication module.

5. The method of claim 4, further including restricting one or more functions or operation from modifying the one or more rules and configuration parameters using the network communication module.

6. The method of claim 4, further including automatically routing one or more data packets to the network communication module according to the one or more rules and configuration parameters.

7. The method of claim 1, further including encrypting one or more data packets sent between the network communication module and the external remote management device according to the configuration instruction.

8. An apparatus of a network interface card having a network communication module, the apparatus comprising one or more processors and memory configured to:
perform a first boot of a host maintaining the network interface card, wherein the first boot initializes the network communication module upon receiving a configuration instruction over a direct network link from an external remote management device on a network endpoint; and
responsive to receiving the configuration construction and configuring the network interface card, perform a second boot via a soft reset of the host, wherein subsequent to the second boot the network communication module suppresses any configuration changes associated with the network interface card, and wherein at any time subsequent to the second boot the network interface card is power cycled or reset by an error condition, the host re-initializes the network communication module and re-configures the network interface card by repeating the steps associated with performing the first boot and the second boot.

9. The apparatus of claim 8, wherein the one or more processors and memory are further configured to receive the configuration instruction along a serverside network configuration sent to the direct network link from an additional operating system at the endpoint.

10. The apparatus of claim 8, wherein the one or more processors and memory are further configured to enable the network communication module to operate in remote managed mode from the external remote management device.

11. The apparatus of claim 8, wherein the one or more processors and memory are further configured to establish one or more rules and configuration parameters using the configuration instruction for communicating with the network communication module.

12. The apparatus of claim 8, wherein the one or more processors and memory are further configured to restrict one or more functions or operation from modifying the one or more rules and configuration parameters using the network communication module.

13. The apparatus of claim 8, wherein the one or more processors and memory are further configured to automatically route one or more data packets to the network communication module according to the one or more rules and configuration instruction.

14. The apparatus of claim 8, wherein the one or more processors and memory are further configured to encrypt one or more data packets sent between the network communication module and the external remote management device according to the configuration instruction.

15. A computer program product for, by a processor, managing bare metal networking in a cloud computing environment, the computer program product comprising a non-transitory computer-readable storage medium having computer-readable program code portions stored therein, the computer-readable program code portions comprising:
an executable portion that performs a first boot of a host, wherein the first boot initializes a network communication module, associated with a network interface card of the host, that receives a configuration instruction over a direct network link from an external remote management device on a network endpoint; and
an executable portion that, responsive to receiving the configuration construction and configuring the network interface card, performs a second boot via a soft reset of the host, wherein subsequent to the second boot the network communication module suppresses any configuration changes associated with the network interface card, and wherein at any time subsequent to the second boot the network interface card is power cycled or reset by an error condition, the host re-initializes the network communication module and re-configures the network interface card by repeating the steps associated with performing the first boot and the second boot.

16. The computer program product of claim 15, further including an executable portion that receives the configuration instruction along a serverside network configuration to the direct network link from an additional operating system at the endpoint.

17. The computer program product of claim 15, further including an executable portion that enables the network communication module to operate in remote managed mode.

18. The computer program product of claim 15, further including an executable portion that establishes one or more rules and configuration parameters using the configuration instruction for communicating with the network communication module.

19. The computer program product of claim 15, further including an executable portion that:
restricts one or more functions or operation from modifying the one or more rules and configuration parameters using the network communication module; and
automatically routes one or more data packets to the network communication module according to the one or more rules and configuration parameters.

20. The computer program product of claim 15, further including an executable portion that encrypts one or more data packets sent between the network communication module and the external remote management device according to the configuration instruction.

* * * * *